UNITED STATES PATENT OFFICE 2,463,264

DERIVATIVES OF CYCLIC AMIDINES AND PROCESS OF MAKING SAME

Charles Graenacher, Riehen, and Franz Ackermann, Binningen, Switzerland, assignors to Ciba Limited, Basel, Switzerland, a Swiss firm No Drawing. Application December 20, 1943, Serial No. 515,024. In Switzerland December 23, 1942

14 Claims. (Cl. 260—240)

According to this invention materials, particularly textile materials, can be improved by bringing onto these materials at any desired stage of their manufacturing or improving process compounds of the general formula

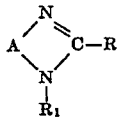

wherein A stands for an aromatic nucleus which, if desired, may be substituted, $R_1$ stands for hydrogen or a substituent, for example, a benzyl radical or a hydroxyalkyl radical, and R stands for an alkyl radical unsaturated in $\alpha:\beta$-position, an aralkyl radical (including aralkyl radicals having unsaturated side chains), a heterocyclic radical or a radical containing a heterocycle, and wherein R may also be substituted, preferably in the form of their water-soluble derivatives, which compounds show a blue to violet fluorescence in daylight or in ultraviolet light and do not or hardly at all stain the material.

In the case of undyed material the white content of the material and in the case of dyed material the purity of the shade are thus improved. This is to be attributed to the fluorescence of the compounds brought onto the material which has the result that e. g. an originally yellow undyed material appears to be white owing to the blue to violet fluorescent compound.

As compounds of the above defined general formula

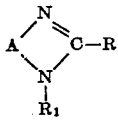

there may be used benzinidazoles substituted at the 2-carbon atom by a side chain unsaturated in $\alpha:\beta$-position, easily obtainable for example by condensation of 2-methyl-benzimidazole with aldehydes, such as acetaldehyde, acrolein, crotonic aldehyde, heptatrienal or benzaldehyde according to analogous processes. Such products are generally capable of forming salts with acids or alkalies which impart to them a more or less pronounced solubility in water.

Pronounced water-soluble derivatives of the compounds of the general formula indicated in the first paragraph are for example the sulfonic acids and sulfuric acid esters or salts thereof derived from these compounds, the condensation products obtained in known manner from the cited water-insoluble compounds by condensation with methylolamides of sulfonated carboxylic acids or with halogenated sulfonic acids, further quaternary ammonium compounds and compounds of the foregoing formula which contain neutralized carboxylic acid groups, further polyglycolic ether radicals. As quaternary ammonium compounds there are used preferably products which are obtained in known manner by condensation of compounds of the formula indicated in the first paragraph with the addition products of tertiary amines to halogen carboxylic acid-N-methylolamides. By condensation with the addition product of triethylamine to chloracetic acid-N-methylolamide there can be introduced, for example, the water-solubilizing atom grouping

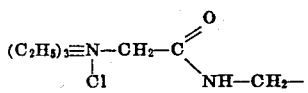

This is an example of the water-solubilizing atom grouping of the general formula

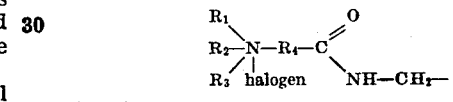

wherein

represents a tertiary amine, for example, an amine having three like or different alkyl radicals, further a dialkylcycloalkylamine such as dimethylcyclohexylamine, and a heterocyclic amine such as pyridine, and $R_4$ represents a bivalent hydrocarbon radical which may be substituted, if desired. Sulfonic acid groups and quaternary ammonium groups are especially suitable as solubilizing groups as they bring about adequate solublity, neutral reaction of the aqueous solution, further stability of the aqueous solution towards the constituents which cause the hardness of water, when applied in sufficient number (1, 2 or more groups, as the case may be).

Advantageously there are used water-soluble derivatives of cyclic amidines such as are obtained by introducing water-solubilizing groups which do not confer any dyestuff character on the end products (such as, for example, an amino group linked to the aryl nucleus of the benzimidazole nucleus) according to known methods into cyclic amidines of the formula

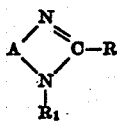

wherein A is a member of the group consisting of aromatic radicals of the benzene and naphthalene series, $R_1$ is a member of the group consisting of hydrogen, alkyl and aralkyl, and R is a radical containing an uninterrupted series of at least four conjugated double bonds which series starts from that carbon atom of the radical R which is bound to the $\mu$-carbon atom of the cyclic amidine nucleus. Numerous examples of such water-soluble derivatives of cyclic amidines of the last mentioned formula and also the methods of their production will be given further below. Examples of radicals having an uninterrupted series of at least four double bonds are

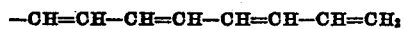

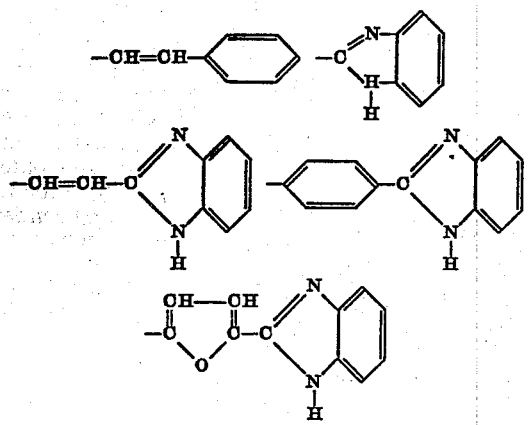

These examples show clearly that double bonds belonging to the uninterrupted system of conjugated double bonds may exist in open chains or in rings, for example, in the benzene, imidazole or furane ring. The presence of such an uninterrupted series of conjugated double bonds generally brings about a strong fluorescence in the ultraviolet light and further—in combination with the radical of the cyclic amidine—a pronounced affinity for cellulose fibers.

Water-soluble derivatives of compounds of the general formula

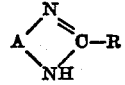

in which A stands for an aromatic nucleus, for example of the benzene or naphthalene series, and R stands for an aralkyl radical having a saturated or unsaturated side chain, for example a benzyl or styryl radical, are for example the sulfonation products of benzinidazoles aralkylated in 2-position, obtained for instance in usual manner by treating with sulfonating agents, in which benzimidazoles the aromatic nuclei may contain also substituents, e. g. amino group acylated for example with benzoic acid. The 2-aralkyl-benzimidazoles necessary for preparing the sulfonation products can be obtained in known manner, for example by condensation of ortho-phenylenediamines with arylated fatty acids, such as phenyl acetic acid, or by condensation of 2-methylbenzimidazoles with aromatic aldehydes. In the latter case aralkyl radicals having an unsaturated side chain, e. g. styryl radicals when using benzaldehydes—which, if desired, may be substituted—are introduced into the 2-position of the benzimidazoles. The sulfonation of such 2-aralkylated benzimidazoles may be effected in usual manner. For example, the starting materials may be treated, if necessary in the heat, with sulfuric acid monohydrate or with sulfuric acid containing sulfuric anhydride.

Sulfonation products of benzimidazoles which contain in 2-position an unsaturated aralkyl or alkyl radical can also be obtained offhand by condensation of 2-methylbenzimidazoles with sulfonated aldehydes, e. g. with benzaldehyde sulfonic acids or acetaldehyde disulfonic acid, according to analogous processes.

Water-soluble derivatives of compounds of the above indicated formula

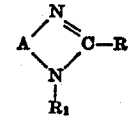

wherein R represents a heterocyclic radical and $R_1$ represents hydrogen or a substituent are for example the sulfonation products of diimidazoles of the formula

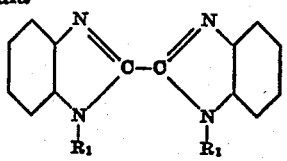

wherein $R_1$ stands for hydrogen or a substituent and wherein also the benzene nuclei may contain substituents, which products are obtainable in known manner. Such unsulfonated compounds, e. g. the diimidazole of the formula

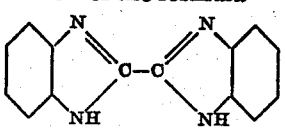

are either known or can be easily prepared according to analogous processes, for example from substituted orthophenylene diamines which may also contain further substituents at the benzene nucleus.

As water-soluble derivatives of compounds of the afore-mentioned general formula

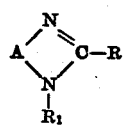

wherein R stands for a radical containing a heterocycle and $R_1$ represents hydrogen or a substituent, there may be named sulfonation products of compounds of the general formula

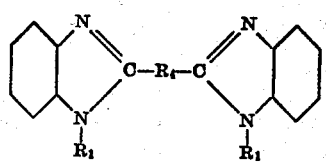

wherein $R_1$ stands for hydrogen or a substituent, e. g. a benzyl radical, and $R_4$ stands for a saturated or unsaturated alkylene radical, for example —CH=CH— or —CH=CH—CH=CH—, and wherein the benzene nuclei linked with imidazole nitrogen atoms may also contain substituents, e. g. alkyl radicals, such as isopropyl radicals, further acylamino groups, which sulfonation products can be obtained in usual manner, for example according to the above indicated process. The diimidazoles required for producing the water-soluble derivatives can be obtained in usual manner, for example by heating orthophenylene diamine with fumaric acid or maleic acid or functional derivatives thereof, for example esters. The N-benzyl derivatives of the cited diimidazoles are also obtainable in usual manner.

Particularly advantageous are water-soluble derivatives of cyclic amidines of the general formula

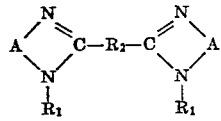

wherein A has the aforesaid significance and $R_2$ represents a bivalent unsaturated radical containing at least one double bond forming with the

double bonds of the imidazole nuclei an uninterrupted series of conjugated double bonds. Examples of compounds in which $R_2$ stands for —CH=CH— or —CH=CH—CH=CH— can be deduced from the data of the preceding paragraph, these are inter alia water-soluble derivatives of cyclic amidines which correspond to the formulas

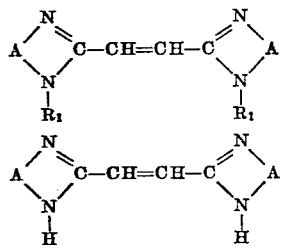

and

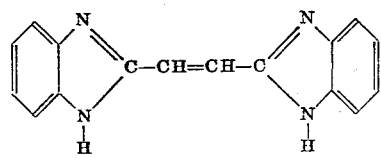

wherein A has the above given significance.

Further examples of water-soluble derivatives of cyclic amidines of the indicated general formula

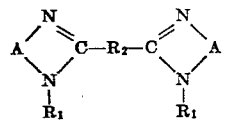

are water-soluble derivatives of cyclic amidines of the general formula

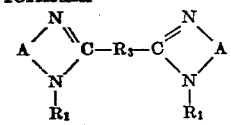

wherein A and $R_1$ have also the above indicated significance and $R_3$ stands for a bivalent radical of the benzene series connecting the $\mu$-carbon atoms of the imidazole rings through a carbon chain containing an even number of carbon atoms.

As compounds of the last mentioned general formula there may be used for example water-soluble derivatives of cyclic amidines which are obtained according to known methods by condensation of aromatic ortho-diamines, such as orthophenylene diamine, with aromatic ortho- or para-dicarboxylic acids, or with heterocyclic dicarboxylic acids containing the carboxylic acid group in 1:2- or 1:4-position, such as terephthalic acid, phthalic acid, diphenyl-p:p'-dicarboxylic acid, furane dicarboxylic acid-(2:5), or functional derivatives thereof, if desired in the presence of condensing agents.

Water-soluble derivatives of the compound of the last indicated general formula are for example the sulfonic acids or their salts derived from these compounds. Such sulfonic acids can be easily obtained in usual manner by treating with sulfonating agents. Among the water-soluble derivatives of compounds of the last indicated general formula there may be mentioned also the condensation products obtained from the cited water-insoluble compounds by condensation with methylolamides of sulfocarboxylic acids, further the condensation products obtained with halogenated sulfonic acids, further compounds of the last indicated general formula which contain quaternary ammonium groups, for example in the form of the already indicated atom grouping

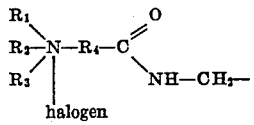

neutralized carboxylic acid groups or polyglycolic ether radicals.

The already mentioned condensation products of compounds of the above mentioned general formula

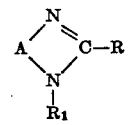

with methylolamides of sulfocarboxylic acids, such as N-hydroxymethyl-sulfoacetic acid amide, can be prepared in usual manner for example analogously to the data of U. S. Patent No. 2,258,721. The condensation with methylolamides containing a quaternary ammonium group can be effected in similar manner.

Also the condensation products of the compounds indicated in column 1 with halogenated sulfonic acids can be obtained in usual manner, preferably by reaction at a raised temperature.

Compounds containing polyglycolic ether radicals as water-solubilizing groups can be obtained from the compounds of the indicated general formula

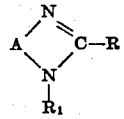

provided that they contain a hydrogen atom linked to an oxygen or nitrogen atom, in the usual manner, for example by the action of alkylene oxides.

Particularly valuable for improving materials, especially fibrous materials, are those water-soluble derivatives of compounds of the formula indicated in the foregoing first paragraph which possess affinity for the materials which are to be improved. The sulfonation products of such compounds of the already mentioned general formula

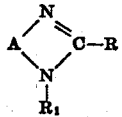

which possess the atom grouping

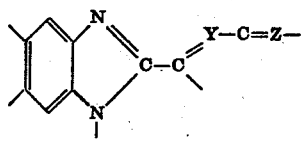

wherein Y and Z stand for =N— or =CH—, are examples of compounds possessing affinity for cellulose or hydrate cellulose.

The products obtained according to the present process can be designated as water-soluble derivatives of cyclic amidines of the formula

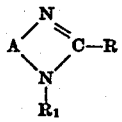

wherein A is a member of the group consisting of aromatic radicals of the benzene and naphthalene series, $R_1$ is a member of the group consisting of hydrogen, alkyl, and aralkyl, and R is a radical containing an uninterrupted series of at least four conjugated double bonds which series starts from that carbon atom of the radical R which is bound to the $\mu$-carbon atom of the cyclic amidine nucleus, which products are liquid to solid substances stable to hydrolysis and soluble in water to form solutions which show fluorescence in ultraviolet light.

The improving process can be carried out in such a manner that the material to be improved is saturated with aqueous solutions or dispersions of the cited compounds and dried after centrifuging or squeezing off. Solutions of 0.001–0.1 per cent. strength are generally sufficient for cellulose materials. The indicated compounds can be applied to the material which is to be improved in the course of the manufacturing process, for example by incorporating the cited compounds into a paper mass mixed with resin glue, or into a viscose solution which is intended for the manufacture of films or threads.

The cited compounds, particularly the water-soluble derivatives, can be used also in admixture with textile assistants, such as are used for improving fibrous materials, for example in combination with washing agents (for instance together with salts of sulfonated benzimidazoles substituted at the 2-carbon atom by higher alkyl radicals, further with salts of monocarboxylic acid esters of 4-sulfophthalic acid with higher fatty alcohols).

Materials which can be improved in accordance with the present process are for example the following: cellulose materials, such as cellulose, paper, further textile materials consisting of cotton, linen, regenerated cellulose including cellulose wool, further natural and artificial materials containing nitrogen, such as wool, silk or synthetic polyamide fibers, finally synthetic materials, produced e. g. by polymerization. The material to be improved can be in any desired form, for example in fibrous form or in the form of a film.

The following examples illustrate the invention without, however, limiting the same, the parts being by weight:

Example 1

12.5 parts of 6-amino-2-(3'amino-styryl)-benzimidazole (prepared analogously to the data in "Berichte der Deutschen Chemischen Gesellschaft," vol. 49 [1916], page 2690, from 6-nitro-2-methyl-benzimidazole and 3-nitrobenzaldehyde and subsequent reduction) are stirred with 100 parts of pyridine at 60° C. 20 parts of anisoyl-chloride are added in drops, the temperature being allowed to rise to the boiling point of the pyridine. The mixture is feebly boiled for 3 hours, cooled, 100 parts of water are added and the whole is kept at 90° C. for 3 hours. After cooling, the precipitated 6-anisoylamino-2-(3'-anisoylamino-styryl)-benzimidazole of the formula.

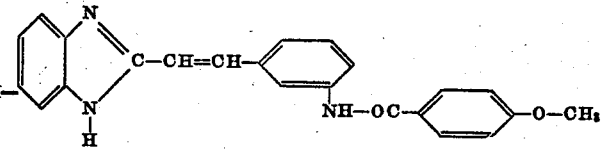

is filtered off, washed with aqueous pyridine and dried. For the purpose of purification it can be recrystallized from aqueous pyridine. A colorless, crystalline powder is obtained which is insoluble in water.

15 parts of the compound thus obtained are dissolved in 150 parts of sulfuric acid monohydrate. 30 parts of fuming sulfuric acid containing 24 per cent. of sulfur trioxide are added in drops at 0–5° C. and the solution is stirred at 5–10° C. until a sample is clearly soluble in water alkaline with sodium carbonate. The whole is poured into ice water whereby part of the product is precipitated. The remainder is obtained by addition of agents having a salting out action, e. g. sodium chloride. After filtering and washing with sodium chloride solution the filter residue is stirred with water, made neutral with aqueous sodium carbonate solution and evaporated to dryness. There is obtained a bright colored powder which is soluble in cold water and can be obtained in salt free state by extraction with methyl alcohol. The strongly diluted aqueous solution shows an intensively sky blue fluorescence in ultraviolet light.

The condensation product of $\mu$-methyl-benzimidazole with heptatrienal can be sulfonated in similar manner.

Example 2

660 parts of ortho-phenylenediamine are heated from 120–160° C. in the course of 3–5 hours with 116 parts of fumaric acid with exclusion of air. As soon as the elimination of water ceases, the temperature is raised to 190° C. and kept for a short time at 190–195° C. until no more water escapes. The mixture is allowed to cool and the ortho-phenylenediamine in excess is removed by extraction with alcohol, benzene or a further solvent. The residue is dissolved in hot dilute hydrochloric acid and the condensation product is precipitated from the solution with an alkaline agent, e. g. ammonia, filtered off and washed with water until neutral. It can be further purified by way of the hydrochloride. It can also be obtained in pure form by means of the sodium salt from alcoholic sodium hydroxide solution.

The new product is a nearly colorless powder which is insoluble to sparingly soluble in water and in the usual organic solvents. It is taken up by dilute hot hydrochloric acid to a faintly yellow solution.

The condensation can be brought about also with less than the indicated quantity of ortho-phenylenediamine, and a condensing agent, e. g. boric acid, can also be used for this purpose.

45 parts of the new condensation product are dissolved in 450 parts of sulfuric acid monohydrate at 20–30° C. 140 parts of fuming sulfuric acid containing 24 per cent of sulfur trioxide are added thereto in drops, the temperature being allowed to rise to 70° C. The mixture is stirred at 70–80° C. until a test portion dissolves clearly in water alkaline with sodium carbonate, allowed to cool, poured into ice water, and the precipitated sulfonic acid is filtered off and washed with water until neutral. The filter residue is stirred with water, made neutral with sodium carbonate and the solution is evaporated to dryness. There is obtained a bright colored powder which is soluble in water. It corresponds to the formula

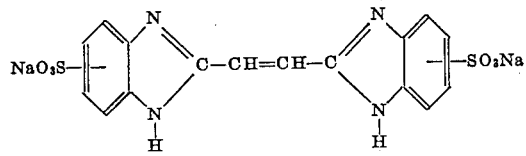

The dilute aqueous solution shows a blue violet fluorescence in daylight or in ultraviolet light.

Products having similar properties are obtained when using maleic acid or maleic anhydrate instead of fumaric acid.

The solubility in water can also be brought about by the action of an excess of ethylene oxide instead of by sulfonation.

*Example 3*

35 parts of 1:2-nitro-aminobenzene are stirred with 250 parts of monochlorobenzene at 70–75° C. 20 parts of fumaric acid dichloride are added in drops, the temperature being allowed to rise to 95° C. Stirring is continued at 95–100° C. until no more hydrochloric acid escapes. The mixture is left to cool, the separated crystalline fumaric acid-di-(ortho-nitranilide) is filtered off, washed with mono-chlorobenzene and dried.

36 parts of this dinitro compound are added to a boiling mixture of 200 parts of glacial acetic acid and 150 parts of hydrochloric acid, whereupon 40 parts of granulated tin are added. The reaction mixture is heated until the nitro compound can no longer be detected. The solution is separated from the undisolved tin by filtration, the filtrate is poured into water which is made alkaline with sodium hydroxide solution, the separated solid powder is filtered off, washed with water until neutral and purified by reprecipitation from dilute hydrochloric acid.

4 parts of the new compound thus obtained are dissolved in 40 grams of sulfuric acid monohydrate, sulfonated with 10 parts of fuming sulfuric acid containing 24 per cent. of sulfur trioxide, according to the data of Example 2, and converted into the corresponding sodium salt.

The water-soluble powder thus obtained shows a blue violet fluorescence in daylight or in ultraviolet light.

*Example 4*

5.2 parts of α:β-di-[benzimidazyl-(2)]-ethylene, obtained according to Example 2, are dissolved in a mixture of 8 parts of concentrated sodium hydroxide solution and 50 parts of alcohol while heating to 70–75° C. 5.2 parts of benzyl chloride are gradually introduced into the solution thus obtained and the reaction mixture is heated for some time to 70–75° C. It is allowed to cool, the precipitated α:β-di-[N-benzyl-benzimidazyl-(2)]-ethylene is filtered off, washed with alcohol until neutral and dried. The new product which can be further purified from alcohol with adition of animal charcoal forms fine bright needles which are insoluble in water. The alcoholic solution of the new compound shows a violet blue fluorescence in ultraviolet light.

5 parts of the product thus obtained of the formula

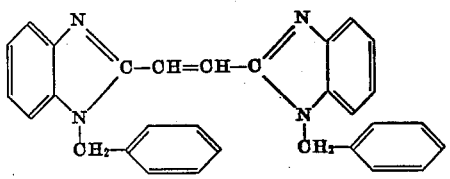

are dissolved in 100 parts of sulfuric acid monohydrate at 5–10° C. and subsequently heated to 60° C. As soon as a test portion is clearly soluble in water alkaline with sodium carbonate, the solution is allowed to cool, poured into ice-water and the precipitated sulfonic acid is filtered off. This is converted into the sodium salt with sodium carbonate according to the data of Example 2. This is a bright powder soluble in water, the aqueous solutions of which show a violet blue fluorescence in ultraviolet light.

The naphthimidazole from 2 mols. of 1:2-naphthylenediamine and fumaric acid can be sulfonated in similar manner.

*Example 5*

The α:β - di - [isopropyl - benzimidazyl - (2)]-ethylene of the formula

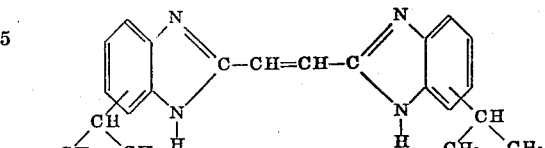

is prepared analogously to the data in Example 2 from isopropyl - phenylenediamine - (1:2) and fumaric acid.

5 parts of this compound are dissolved in 75 parts of sulfuric acid monohydrate and heated to 80° C. until a test portion is soluble in water alkaline with sodium carbonate. The solution is allowed to cool and poured into ice water, the further operations being as described in Example 2. There is obtained a powder soluble in water, the aqueous solutions of which show a violet fluorescence in ultraviolet light.

The above used ortho-phenylenediamine isopropylated in the nucleus can be prepared in known manner from 1:2-di-chlorobenzene by isopropylation and subsequent replacement of the chlorine atoms by amino groups.

The sodium salt of the sulfonated diimidazole from 5-chloro-1:2-diaminobenzene or 5-methoxy-1:2-diaminobenzene and fumaric acid has similar properties.

Example 6

10 parts of α:β-di-[benzimidazyl-(2)]-ethane are dissolved in 100 parts of sulfuric acid monohydrate. 20 parts of fuming sulfuric acid containing 24 per cent. of sulfur trioxide are added in drops, the temperature being allowed to rise to 80° C. As soon as a test portion is soluble in water alkaline with sodium carbonate, the solution is allowed to cool, poured into ice water, the precipitated sulfonic acid is filtered off and washed with water. The filter residue is stirred with water, made neutral with aqueous sodium carbonate solution and evaporated to dryness. There is obtained a colorless powder of the formula NaO₃S——C—CH₂—CH₂—C——SO₃Na which is soluble in water and the solution of which shows a violet blue fluorescence in ultraviolet light.

Example 7

15 parts of di-benzimidazyl-(2:2') are dissolved in 200 parts of sulfuric acid monohydrate and heated to 80° C. 30 parts of fuming sulfuric acid containing 24 per cent. Of sulfur trioxide are introduced in drops. As soon as a test portion is soluble in water alkaline with sodium carbonate, the solution is allowed to cool, poured into ice water with addition of sodium chloride, the precipitated sulfonic acid is filtered off, washed with water and converted into the sodium salt.

The dry, water-soluble product of the formula

NaO₃S——C—C——SO₃Na forms a bright powder, the aqueous solutions of which show a violet fluorescence in ultraviolet light.

Example 8

5.2 parts of α:β-di-[benzimidazyl-(2)]-ethylene are introduced at 5–10° C. into 100 parts of sulfuric acid monohydrate, the solution is cooled to 0–5° C. and 10 parts of sodium methylolacetamide sulfonate are gradually added. The whole is stirred at 0–5° C. for 6 hours and the temperature is then allowed to rise slowly to about 20° C. As soon as a test portion dissolves in water, the solution is poured into ice water, the new condensation product is salted out, for example with sodium chloride, filtered and washed with sodium chloride solution. The filter residue is taken up in water, neutralized with sodium carbonate solution and evaporated to dryness. There is obtained a bright colored powder of the probable formula

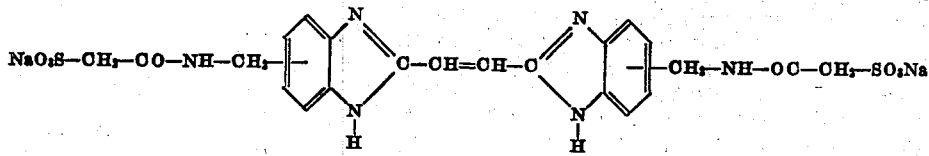

which is soluble in water. The aqueous solution shows a violet fluorescense in ultraviolet light.

Example 9

6.6 parts of 2-methylbenzimidazole are thoroughly triturated with 16 parts of sodium benzaldehyde-2:4-disulfonate and 0.1 part of boric acid and heated to 180–185° C. until the condensation is complete. There is obtained a bright water-soluble powder of the formula C—CH=CH—⟨⟩—SO₃Na
                SO₃Na the aqueous solutions of which show a blue violet fluorescence in ultraviolet light. The condensation can also be carried out in water at 140–180° C. under pressure.

Example 10

16.6 parts of terephthalic acid are heated to 190° C. in the course of about 6 hours with 70 parts of ortho-phenylene-diamine and 0.5 part of boric acid with exclusion of air. The temperature is maintained at 190–195° C. until the elimination of water is complete, the solution is cooled, the ortho-phenylene-diamine in excess is removed by extraction with alcohol and the residue is dried.

7.5 parts of the 1:4-di-[benzimidazyl-(2')]-benzene thus obtained are dissolved in 75 parts of sulfuric acid monohydrate at 20–30° C. and heated to 70° C. 20 parts of fuming sulfuric acid containing 24 per cent. of sulfur trioxide are introduced into this solution drop by drop. This is stirred at 70° C. until a test portion dissolves clearly in water alkaline with sodium carbonate, allowed to cool, poured into ice water, the precipitated sulfonic acid is filtered off and washed with water until neutral. The filter residue is stirred with water, made neutral with sodium carbonate and the solution is evaporated to dryness. There is obtained a bright powder of the formula NaO₃S——C—⟨⟩—C——SO₃Na which is soluble in water. The dilute aqueous solution shows a violet fluorescence in daylight or in ultraviolet light.

The sodium salt of the sulfonated 1:2-di-[benzimidazyl-(2)]-benzene, obtainable in analogous manner, has similar properties.

Instead of by sulfonation, the solubility in water can also be brought about by condensation with the addition product of triethylamine to chloracetic acid-N-methylolamide. This condensation can be effected in similar manner as described in Example 17.

Example 11

27 parts of 1-methoxy-3:4-diaminobenzene, 16.6 parts of terephthalic acid and 1 part of boric acid are heated to 160–180° C. with exclusion of air until the elimination of water is complete. The solution is allowed to cool, any terephthalic acid still present is removed with aqueous sodium carbonate solution, the residue is heated with dilute hydrochloric acid, filtered, the condensation product is precipitated with aqueous ammonia solution, filtered and dried.

The 1:4 - di - [6'-methoxy-benzimidazyl-(2')]-benzene can be further purified by way of its hydrochloride.

5 parts of 1:4-di-[6'-methoxy-benzimidazyl-(2')]-benzene are dissolved at room temperature in 50 parts of sulfuric acid monohydrate, the temperature is raised to 60° C. and 15 parts of fuming sulfuric acid containing 24 per cent. of sulfur trioxide are introduced into this solution drop by drop. As soon as a test portion dissolves in water alkaline with sodium carbonate, the solution is allowed to cool, poured into ice water, the precipitated sulfonic acid is filtered off and washed with water until neutral. The filter residue is stirred with water, made alkaline with sodium carbonate and the solution is evaporated to dryness. The powder thus obtained is heated with methanol and animal charcoal, filtered, and the filtrate is evaporated to dryness. There is obtained a nearly colorless powder of the formula

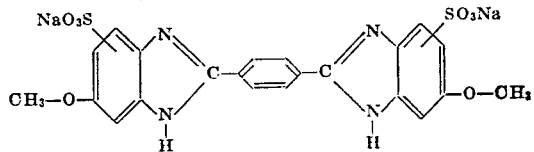

which is soluble in water. The dilute aqueous solution shows a violet fluorescence.

When using the sodium salt of the sulfonated 1:4-di-[6'-chloro-benzimidazyl - (2')] - benzene instead of the sodium salt of sulfonated 1:4-di-[6'-methoxy - benzimidazyl - (2')] - benzene, there is obtained a similar effect. This product can be obtained as a bright powder from 1-chloro-3:4-diaminobenzene, terephthalic acid and boric acid, at 130° C., with subsequent sulfonation according to the above data.

Example 12

The 1:4-di[benzimidazyl - (2')]-2 - chlorobenzene is prepared from 1:2-diaminobenzene and chloro-terephthalic acid analogously to the data of Example 11.

5 parts of this compound are dissolved in 50 parts of sulfuric acid-monohydrate and heated to 60° C. 10 parts of fuming sulfuric acid containing 24 per cent. of sulfur trioxide are introduced into the solution in drops. The whole is stirred at 60–65° C. until a test portion dissolves clearly in water alkaline with sodium carbonate, allowed to cool, poured into ice water, the precipitated sulfonic acid is filtered off and washed with water. The filter residue is stirred with water, made neutral with aqueous sodium carbonate solution and evaporated to dryness. There is obtained a powder of the formula

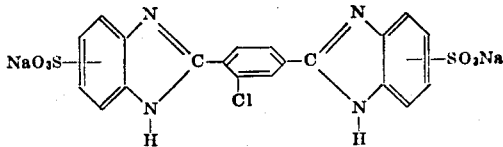

which is soluble in water, the solution of which shows a violet fluorescence in ultraviolet light.

Example 13

6.2 parts of furane-2:5-dicarboxylic acid, 8.6 parts of 1:2-diaminobenzene and 0.1 part of boric acid are heated to 140–150° C. with exclusion of air until the elimination of water is complete. The solution is allowed to cool, any 1:2-diaminobenzene and furane-2:5-dicarboxylic acid which may still be present are removed by extracting with cold, dilute hydrochloric acid and sodium carbonate solution, the mixture is dissolved in hot, dilute hydrochloric acid and the condensation product is precipitated with a solution of ammonia. It is filtered, washed with water and dried. The 2:5-di-[benzimidazyl-(2')] - furane thus obtained forms a bright powder which is sparingly soluble in water.

5 parts of the above-obtained 2:5-di-[benzimidazyl-(2')]-furane are dissolved in 50 parts of sulfuric acid monohydrate and heated to 50° C. 15 parts of fuming sulfuric acid containing 24 per cent. of sulfur trioxide are added to the solution in drops. As soon as a test portion dissolves clearly in water alkaline with sodium carbonate, the solution is allowed to cool, poured into ice water, the remains of the sulfonic acid are salted out with sodium chloride, filtered and washed with sodium chloride solution. The precipitated sulfonic acid is stirred with water, neutralized with sodium carbonate solution and the solution is evaporated to dryness. There is obtained a bright powder of the formula

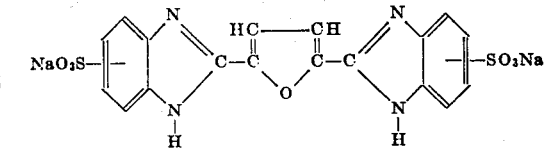

which dissolves in water to a clear solution. The solution shows a blue violet fluorescence.

The diimidazole of the formula

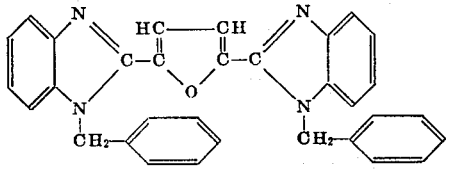

can be sulfonated in similar manner.

Example 14

47 parts of 6-amino-2-(styryl)-benzimidazole are stirred with 200 parts of pyridine at 60–70° C. 66 parts of melted benzoylchloride-3-sulfonic acid are gradually added to this solution, the temperature being allowed to rise to the boiling point of pyridine. The whole is kept boiling until a test portion has become soluble in water. The solution is allowed to cool, poured into ice water and acidified with hydrochloric acid. The condensation product is precipitated, filtered off, washed with water and stirred at 50–60° C. with 1 liter of water to which sodium carbonate solution has been added, until it shows a strongly alkaline reaction. The whole is then filtered to remove the small solid portions and the filtrate is evaporated to dryness in a vacuum at 50° C. There is obtained a water-soluble powder of the formula

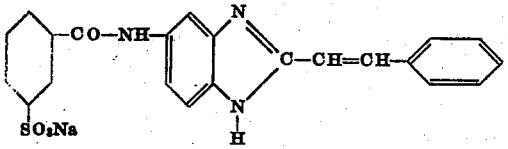

Example 15

27 parts of terephthalic aldehyde, 5 parts of boric acid and 500 parts of 2-methylbenzimidazole are heated to 195–200° C. until the elimination of water is complete. The mixture is allowed to cool and the 2-methyl-benzimidazole, the boric acid and small quantities of by-products are removed by extracting with alcohol. The residue is dried; it forms a bright yellow powder of the formula

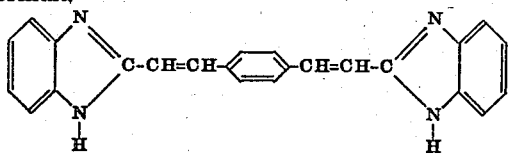

10 parts of this product are dissolved at room temperature in 100 parts of sulfuric acid monohydrate and heated to 50° C. 25 parts of fuming sulfuric acid containing 24 per cent. of sulfur trioxide are added to this solution in drops, the temperature being allowed to rise to 70° C. The whole is stirred at 70° C. until a test portion dissolves in water alkaline with sodium carbonate, then allowed to cool, poured into ice water, the precipitated sulfonic acid is filtered and washed with water until neutral. The filter residue is stirred with water, made neutral with sodium carbonate and the solution is evaporated to dryness. There is obtained a feebly yellow powder which is soluble in water. The dilute aqueous solution shows a bluish fluorescence in daylight or in ultraviolet light.

Example 16

22 parts of 2-styrylbenzimidazole are dissolved at 0–5° C. in 250 parts of sulfuric acid monohydrate. 37 parts of N-methylol-chloroacetamide are introduced into the solution, stirred at 0–5° C. for 8 hours, and the temperature is then gradually raised to 20° C. The whole is poured into ice water, the new condensation product is filtered off, washed with water until neutral and dried in a vacuum at 50–60° C. There is obtained a colorless powder which is insoluble in water.

3 parts of this product and 30 parts of pyridine are allowed to stand at room temperature until a test portion is soluble in water. The solution is then evaporated to dryness at 30–40° C. in a vacuum.

There is obtained a bright colored powder which is soluble in water; the solution shows a violet fluorescence in ultraviolet light.

Example 17

5.2 parts of α:β-di-[benzimidazyl-(2)]-ethylene are dissolved at 0–5° C. in 50 parts of sulfuric acid monohydrate. 11 parts of the addition product of trimethylamine to methylolchloroacetamide are added to the solution. The whole is stirred for some time at 0–5° C. and the temperature is allowed to rise gradually to 20° C. It is then poured into ice water, the remains of the new condensation product are salted out, e. g. with sodium chloride, filtered, washed with sodium chloride solution and dried at a low temperature in a vacuum.

There is obtained a feebly yellow colored powder which is soluble in water. The dilute aqueous solution shows a violet fluorescence in ultraviolet light. The product corresponds very probably to the formula

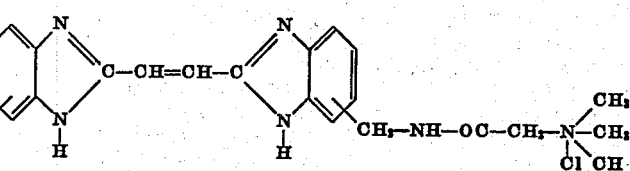

Example 18

9 parts of α:α'-dimethyl-benz-di-imidazole (Berichte der Deutschen Chemischen Gesellschaft, vol. 45, page 3251), 12 parts of benzaldehyde and 0.1 part of boric acid are heated at 170–180° C. until the elimination of water is complete. The mixture is allowed to cool, small quantities of the starting materials are separated with boiling ethyl alcohol and the residue is dried. The condensation product obtained is insoluble in water.

5 parts of the condensation product are dissolved in 50 parts of sulfuric acid-monohydrate and kept at 50° C. until a test portion dissolves clearly in water alkaline with sodium carbonate. The solution is allowed to cool, poured into ice water, the precipitated sulfonic acid is filtered off and washed with water until neutral. The filter residue is stirred with water, made neutral with sodium carbonate and the solution is evaporated to dryness. The powder obtained is soluble in water. A dilute aqueous solution shows a bluish fluorescence in ultraviolet light. The product corresponds to the formula

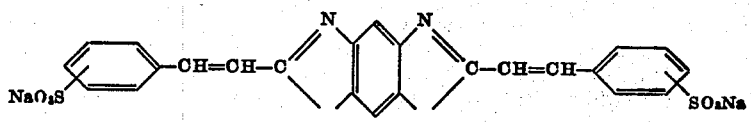

Example 19

13 parts of α:β-di-[benzimidazyl-(2')]-ethane are heated to 180–185° C. for 24 hours in a melting tube with 15 parts of benzaldehyde and 50 parts of glacial acetic acid. The acetic acid and the benzaldehyde in excess are distilled in a vacuum at 100° C. and the residue is allowed to cool. There is obtained a powder which is insoluble in water; it dissolves in alcohol and can be crystallized therefrom after addition of some water. 10 parts of the new product are dissolved in 150 parts of sulfuric acid monohydrate and the temperature is raised to 80° C. The solution is stirred at 80–85° C. until a test portion has become soluble in water alkaline with sodium carbonate. It is then allowed to cool, poured into ice water, the precipitated sulfonic acid is filtered off and washed with sodium chloride solution. The filter residue is stirred with water, made neutral with sodium carbonate solution and evaporated to dryness. There is obtained a powder which is soluble in water. An aqueous solution shows a violet fluorescence in the ultraviolet light.

A product having similar properties is obtained when using 15 parts of 4-methoxy-benzaldehyde instead of benzaldehyde.

Example 20

5.3 parts of $\alpha:\beta$-di-[benzimidazyl-(2')]-ethane, 21 parts of benzaldehyde-2:4-sodium disulfonate of 66.4 per cent. strength, 50 parts of glacial acetic acid and 5 parts of water are heated to 180° C. for 24 hours in a melting tube. After cooling, the solution obtained is evaporated to dryness at 80–100° C. in a vacuum. The powder obtained is soluble in water. The solution shows a violet fluorescence in daylight or in ultraviolet light.

Example 21

Bleached cotton yarn is boiled for ½ hour in a bath containing per liter 0.01 gram of the sodium salt of the sulfonated 6-anisoylamino-2-(3'-anisoylamino-styryl)-benzimidazole described in Example 1 and 1 gram of a mixture from 15 parts of the sodium salt of 2-heptadecyl-benzimidazole sulfonic acid and 85 parts of anhydrous sodium carbonate, the ratio of goods to liquor being 1:50. The material is rinsed in hot water and dried. The cotton terated in such a manner possesses a higher white content than the material obtained in similar manner, but without the addition of the sulfonated 2-styryl-benzimidazole derivative.

Example 22

Bleached cotton yarn is treated for 15 minutes at room temperature in a bath containing per liter 0.05 gram of the sodium salt of the sulfonated $\alpha:\beta$-di-[benzimidazyl-(2)]-ethylene described in Example 2, the ratio of goods to liquor being 1:50.

The rinsed and dried cotton yarn possesses a higher white content than the untreated material.

Example 23

Bleached cotton yarn is treated as indicated in Example 22, but using the auxiliary agent described in Example 3. Also in this case the aftertreatment brings about an increase in white content.

Example 24

Bleached cotton yarn is boiled for ½ hour in a bath containing per liter 0.01 gram of the sodium salt of the sulfonated $\alpha:\beta$-di-[N-benzyl-benzimidazyl-(2)]-ethylene described in Example 4 and 1 gram of soap, the ratio of goods to liquor being 1:50. The material is rinsed in hot water and dried. The cotton treated in such a manner possesses a higher white content than the material obtained in similar manner, but without the addition of the sulfonated benzimidazole derivative.

Example 25

Bleached cotton yarn is treated as indicated in Example 22, but using the sodium salt of the sulfonated $\alpha:\beta$-di-[propyl-benzimidazyl-(2)]-ethylene described in Example 5 instead of the assisting agent named there, whereby a similar result is obtained.

Example 26

To a paper mass there are added in the pulp engine first of all 2 per cent. of resin glue and after about 15 minutes 0.04–0.08 per cent. of the sodium salt of the sulfonated $\alpha:\beta$-di-[benzimidazyl-(2)]-ethylene described in Example 2, dissolved in hot water in the proportion 1:10. After about 15 minutes there are added 3 per cent. of aluminum sulfate. The paper mass treated in such a manner is then passed into the paper machine by way of the mixing tank. (The indicated percentages relate to air-dry fibrous material.)

Compared with untreated material, the material treated in such a manner has an appreciably whiter appearance.

Example 27

Bleached tissue paper free from wood is passed in the dipping process through a solution containing per liter of water 0.5 to 1 gram of the sodium salt of the sulfonated $\alpha:\beta$-di-[benzimidazyl-(2)]-ethylene described in Example 2. The white content of the tissue paper is considerably increased by this treatment.

Example 28

0.01 to 0.05 per cent. of the sodium salt of the sulfonated $\alpha:\beta$-di-[benzimidazyl-(2)]-ethylene is added to a viscose solution intended for producing films or threads. The films or fibers obtained from this solution in usual manner possess a higher white content than the films or threads produced without the said addition which have a slightly yellow coloring.

Example 29

Bleached cotton yarn is boiled for ½ hour in a liquor containing per liter 0.01 to 0.05 gram of 2-styryl-benzimidazole and 1 gram of sodium carbonate (liquor ratio=1:100). The material is then rinsed and dried.

The cotton treated in such a manner possesses a higher white content than the untreated material.

Instead of 2-styryl-benzimidazole there may be used in similar manner the product obtained by condensation of 2-methyl-benzimidazole with crotonic aldehyde, containing a doubly unsaturated alkyl radical in 2-position, or the 1:5-di-[benzimidazyl-(2')]-furane.

Example 30

The following discharge color is printed onto a cotton fabric dyed with 3 per cent. of Direct Fast Scarlet WS (Supplement to the Colour Index, page 39, 2nd column):

|  | Grams |
|---|---|
| Sodium formaldehyde sulfoxylate | 150 |
| Crystal gum 1:2 | 500 |
| Glycerine | 50 |
| Water | 300 |
|  | 1000 |

The printed material is dried, steamed, thoroughly rinsed in running water and again dried. It is then after-treated for 15 minutes at 25° C. in a bath containing per liter 1 gram of the sodium salt of the sulfonated α:β-di-[benzimidazyl-(2)]-ethylene described in Example 2, the ratio of goods to liquor being 1:50, rinsed for a short time and dried.

The white content of the discharged places is thus greatly enhanced.

Example 31

The following discharge color is printed onto a cotton fabric dyed with 3 per cent. of Direct Copper Blue BR (Schultz, Farbstofftabellen 7th edition, vol II, page 38):

| | Grams |
|---|---|
| Sodium formaldehyde sulfoxylate | 150 |
| Crystal gum 1:2 | 500 |
| Glycerine | 50 |
| Water | 295 |
| Sodium salt of the sulfonated α:β-di-[benzimidazyl-(2)]-ethylene described in Example 2 | 5 |
| | 1000 |

The printed material is dried, steamed, thoroughly rinsed in running water and again dried.

The places discharged in such a manner possess a considerably higher white content than the parts discharged in similar manner, but without the addition of the indicated benzimidazole derivative.

Example 32

A two color pattern consisting of

Red: 150 gram/kg. Ciba Scarlet BG, paste, (Schultz, Farbstofftabellen 7th ed., vol II, page 63)

Blue: 20 gram/kg. Cibanone Blue GCD (Supplement to the Colour Index, page 35, 1st column)

is printed in film printing onto a crudely mercerized boiled cotton fabric.

The material treated in such a manner is after-treated at 25° C. for 15 minutes in a bath containing per liter 1 gram of the sodium salt of the sulfonated α:β-di-[benzimidazyl-(2)]-ethylene described in Example 2, the ratio of goods to liquor being 1:50, then briefly rinsed and dried.

The white content of the white places is greatly enhanced by this after-treatment.

Example 33

To a paper mass there are added in the pulp engine first of all 2 per cent. of resin glue and after about 10 minutes 0.04–0.08 per cent. of the sodium salt of the sulfonated 1:4-di-[benzimidazyl-(2')]-benzene described in Example 10, dissolved in hot water in the proportion 1:10. After about 15 minutes there are added 3 per cent. of aluminum sulfate. The paper mass treated in such a manner is then passed into the paper machine by way of the mixing tank. (The indicated percentages relate to air-dry fibrous material).

The white content of the paper is increased by such a treatment.

Example 34

Bleached cotton yarn is treated for ½ hour at room temperature in a bath containing per liter 0.05–0.5 gram of the sodium salt of the sulfonated 1:4-[6'-methoxy-benzimidazyl-(2')]-benzene described in Example 11, the ratio of goods to liquor being 1:50. The rinsed and dried cotton yarn possesses a higher white content than the untreated material.

What we claim is:

1. A process for the manufacture of a water-soluble derivative of a benzimidazole, which comprises sulfonating a benzimidazole of the formula

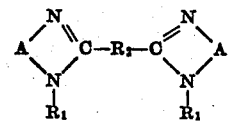

wherein A is a radical of the benzene series in which two vicinal carbon atoms are bound to the nitrogen atoms of the imidazole ring, $R_1$ is a member selected from the group consisting of hydrogen, alkyl and aralkyl, and $R_2$ is a bivalent unsaturated radical containing at least one double bond forming with the $$>C=N-$$

double bonds of the imidazole nuclei an uninterrupted series of conjugated double bonds.

2. A process for the manufacture of a water-soluble derivative of a benzimidazole, which comprises sulfonating a benzimidazole of the formula

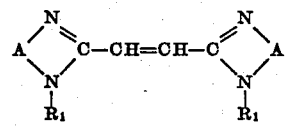

wherein A is a radical of the benzene series in which two vicinal carbon atoms are bound to the nitrogen atoms of the imidazole ring and $R_1$ is a member selected from the group consisting of hydrogen, alkyl and aralkyl.

3. A process for the manufacture of a water-soluble derivative of a benzimidazole, which comprises sulfonating a benzimidazole of the formula

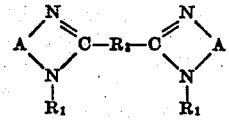

wherein A is a radical of the benzene series in which two carbon atoms are bound to the nitrogen atoms of the imidazole ring, $R_1$ is a member selected from the group consisting of hydrogen, alkyl and aralkyl, and $R_3$ is a bivalent radical of the benzene series connecting the μ-carbon atoms of the imidazole rings by a carbon chain containing an even number of carbon atoms.

4. A disulfonic acid of a benzimidazole of the formula

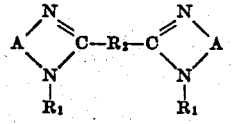

wherein A is a radical of the benzene series in which two vicinal carbon atoms are bound to the nitrogen atoms of the imidazole ring, $R_1$ is a member selected from the group consisting of hydrogen, alkyl and aralkyl, and $R_2$ is a bivalent unsaturated radical containing at least one double bond forming with the $$>C=N-$$

double bonds of the imidazole nuclei an uninterrupted series of conjugated double bonds, each sulfonic acid group of the said disulfonic acid being bound to a benzene nucleus.

5. A disulfonic acid of a benzimidazole of the formula

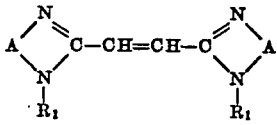

wherein A is a radical of the benzene series in which two vicinal carbon atoms are bound to the nitrogen atoms of the imidazole ring, and $R_1$ is a member selected from the group consisting of hydrogen, alkyl and aralkyl, each sulfonic acid group of the said disulfonic acid being bound to a benzene nucleus.

6. The sulfonated benzimidazole of the formula

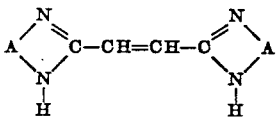

wherein A is a radical of the benzene series which contains a sulfonic acid group and in which two ortho-standing carbon atoms are bound to the nitrogen atoms of the imidazole ring.

7. A disulfonic acid of a benzimidazole of the formula

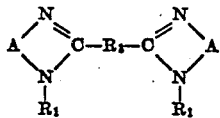

wherein A is a radical of the benzene series in which two vicinal carbon atoms are bound to the nitrogen atoms of the imidazole ring, $R_1$ is a member selected from the group consisting of hydrogen, alkyl and aralkyl, and $R_3$ is a bivalent radical of the benzene series connecting the $\mu$-carbon atoms of the imidazole rings by a carbon chain containing an even number of carbon atoms, each sulfonic acid group of the said disulfonic acid being bound to a benzene nucleus.

8. A process for the manufacture of a water-soluble derivative of a benzimidazole, which comprises sulfonating a benzimidazole of the formula

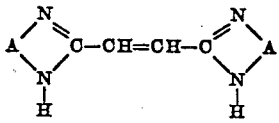

wherein A is a radical of the benzene series in which two vicinal carbon atoms are bound to the nitrogen atoms of the imidazole ring.

9. A process for the manufacture of a water-soluble derivative of a benzimidazole, which comprises sulfonating the benzimidazole of the formula

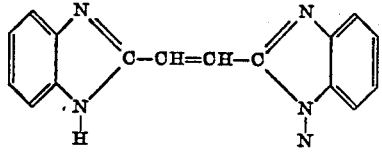

10. A process for the manufacture of a water-soluble derivative of a benzimidazole, which comprises sulfonating the benzimidazole of the formula

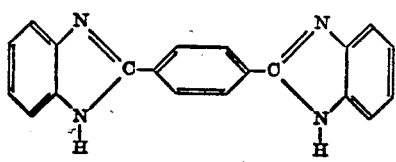

11. A process for the manufacture of a water-soluble derivative of a benzimidazole, which comprises sulfonating the benzimidazole of the formula

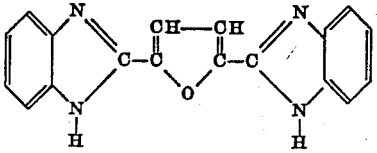

12. The disulfonic acid of the formula

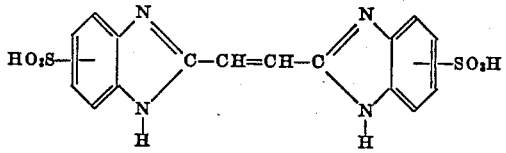

which in the form of an alkali metal salt is a solid substance soluble in water to form solutions which show a strong bluish fluorescence in the ultraviolet light.

13. The disulfonic acid of the formula

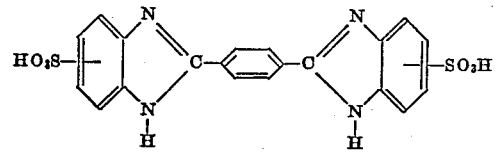

which in the form of an alkali metal salt is a solid substance soluble in water to form solutions which show a strong bluish fluorescence in the ultraviolet light.

14. The disulfonic acid of the formula

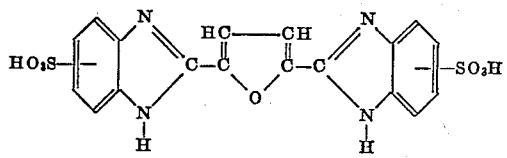

which in the form of an alkali metal salt is a solid substance soluble in water to form solutions which show a strong bluish fluorescence in the ultraviolet light.

CHARLES GRAENACHER.
FRANZ ACKERMANN.

REFERENCES CITED

The following references are of record in the file of this patent:

UNITED STATES PATENTS

| Number | Name | Date |
|---|---|---|
| 851,444 | Schulthess | Apr. 23, 1907 |
| 2,036,525 | Graenacher | Apr. 7, 1936 |
| 2,094,809 | Olpin et al. | Oct. 5, 1937 |
| 2,148,920 | Zerweck et al. | Feb. 28, 1939 |
| 2,170,474 | Graenacher et al. | Aug. 22, 1939 |
| 2,186,894 | Brodersen et al. | Jan. 9, 1940 |
| 2,194,419 | Chwala | Mar. 19, 1940 |
| 2,256,163 | Kametat et al. | Sept. 16, 1941 |
| 2,289,300 | Wilmanns | July 7, 1942 |
| 2,320,654 | Riester | June 1, 1943 |
| 2,323,503 | Wilson | July 6, 1943 |
| 2,369,122 | Giles et al. | Feb. 13, 1945 |

FOREIGN PATENTS

| Number | Country | Date |
|---|---|---|
| 651,432 | Germany | Oct. 13, 1937 |

Certificate of Correction

Patent No. 2,463,264. March 1, 1949.

CHARLES GRAENACHER ET AL.

It is hereby certified that errors appear in the printed specification of the above numbered patent requiring correction as follows:

Column 1, line 40, for "benzinidazoles" read *benzimidazoles*; column 2, line 48, for "solublity" read *solubility*; column 3, lines 32 to 35, for the formulae reading

lines 36 to 40, after that portion of the formula ending with

and before the following formula beginning with

insert a semicolon; line 70, for "benzinidazoles" read *benzimidazoles*; line 74, for "group" read *groups*; column 6, line 44, for "fromula" read *formula*; column 9, line 47, for "anhydrate" read *anhydride*; line 68, for "undisolved" read *undissolved*; column 10, line 22, for "adition" read *addition*; column 11, line 44, for "Of sulfur" read *of sulfur*; column 12, line 14, for "fluorescense" read *fluorescence*; column 16, Example 17, extreme lower right hand portion of the formula, for "CH" read CH$_3$; same column, Example 18, for that portion of the formula reading

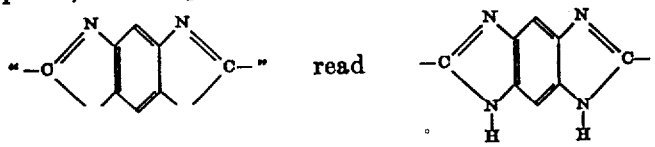

column 17, line 46, for "terated" read *treated*;

and that the said Letters Patent should be read with these corrections therein that the same may conform to the record of the case in the Patent Office.

Signed and sealed this 30th day of August, A. D. 1949.

[SEAL]

THOMAS F. MURPHY,
*Assistant Commissioner of Patents.*